No. 793,185. PATENTED JUNE 27, 1905.
P. GAMPHER.
EARTH AUGER.
APPLICATION FILED AUG. 1, 1904.
2 SHEETS—SHEET 1.
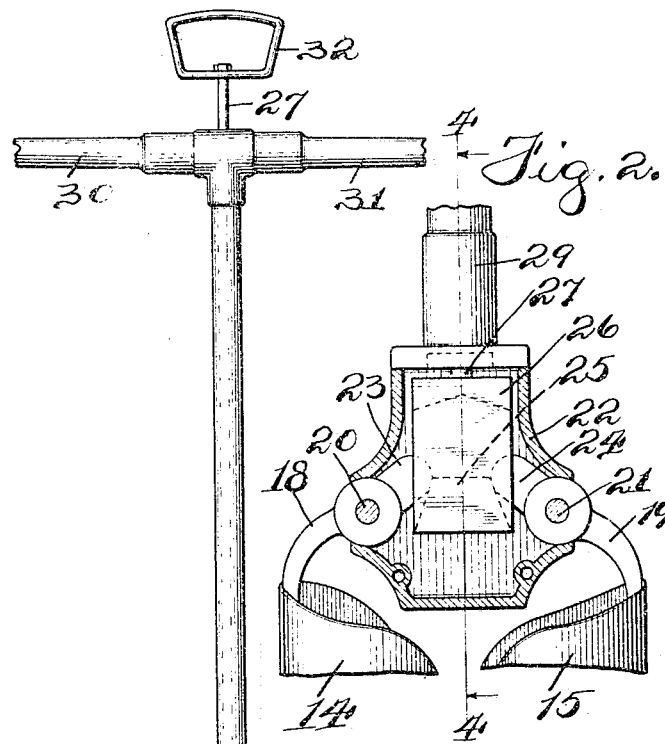
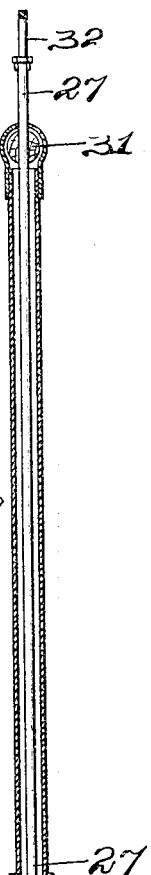
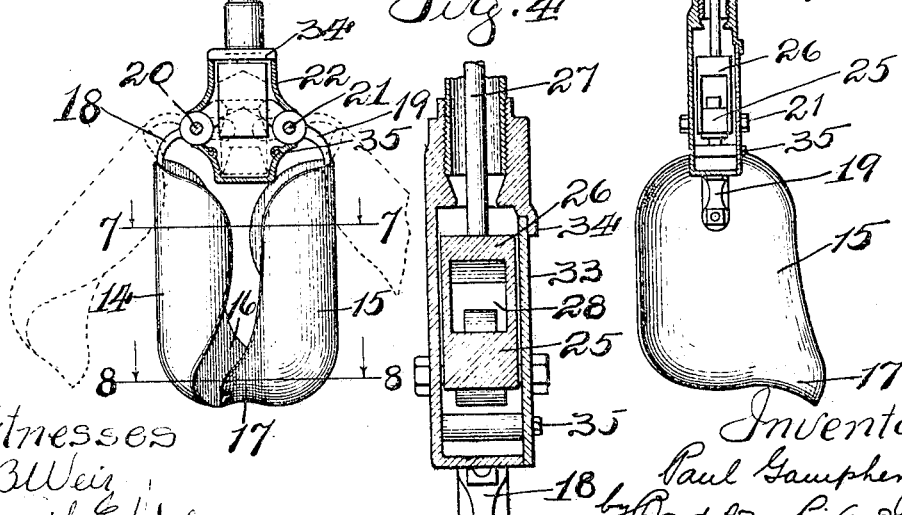

No. 793,185. PATENTED JUNE 27, 1905.
P. GAMPHER.
EARTH AUGER.
APPLICATION FILED AUG. 1, 1904.
2 SHEETS—SHEET 2.
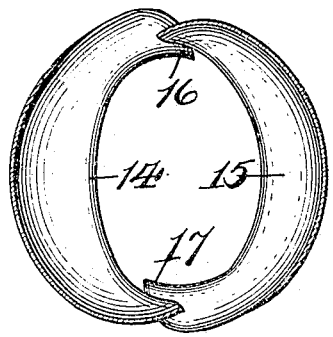
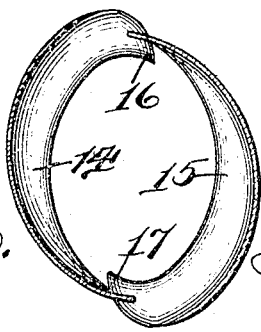
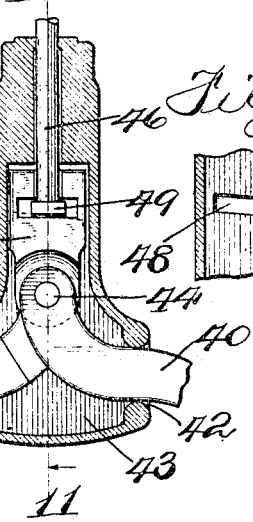
Witnesses:
J. B. Weir,
Emil F. Wettmann
Inventor:
Paul Gampher,
by Bond, Adams, Pickard & Jackson,
his Attys.

No. 793,185. Patented June 27, 1905.

UNITED STATES PATENT OFFICE.

PAUL GAMPHER, OF CHICAGO, ILLINOIS.

EARTH-AUGER.

SPECIFICATION forming part of Letters Patent No. 793,185, dated June 27, 1905.

Application filed August 1, 1904. Serial No. 219,078.

*To all whom it may concern:*

Be it known that I, PAUL GAMPHER, a citizen of the United States, and a resident of Chicago, in the county of Cook and State of Illinois, have invented certain new and useful Improvements in Earth-Augers, of which the following is a specification, reference being had to the accompanying drawings.

My invention relates to earth-augers, and has for its object to provide certain improvements in augers of the general type shown in my Patent No. 386,397, dated July 17, 1888. Such improvements relate to the form and arrangement of the cutting or boring blades or shovels, to the devices for moving said blades toward or from each other and for locking them in operative position, and to the construction of the casing.

My improved auger is hereinafter fully described.

What I regard as new is set forth in the claims.

In the accompanying drawings, Figure 1 is a side view of my improved auger, part of the casing being in section. Fig. 2 is an enlarged detail showing a part of the casing in section. Fig. 3 is a central longitudinal section, some parts being in elevation. Fig. 4 is a vertical section on line 4 4 of Fig. 2. Fig. 5 is an enlarged sectional detail showing a construction similar to that shown in Fig. 2, but embodying some further improvements. Fig. 6 is a vertical section on line 6 6 of Fig. 5. Fig. 7 is a cross-section of the blades on line 7 7 of Fig. 1. Fig. 8 is a cross-section thereof on line 8 8 of Fig. 1. Fig. 9 is a perspective view of the removable side plate. Fig. 10 is an enlarged detail showing my improved locking device applied to an auger in which the blades are mounted as shown in my former patent. Fig. 11 is a vertical section on line 11 11 of Fig. 10. Fig. 12 is a sectional view showing part of the removable side plate used in connection with the construction shown in Figs. 10 and 11, and Fig. 13 is a cross-section on line 13 13 of Fig. 11.

My improved auger comprises a pair of cooperating cutting or boring blades which are in general semicircular in cross-section and are arranged in opposition, so that together they form a substantially cylindrical figure. The lower portion of the front edge of each blade is extended toward the rear edge of the other blade, so that the blades may be said to overlap. When in operative position, the blades are substantially parallel with the stem of the auger. Each of said blades is carried by an arm which is arranged to be rocked by the longitudinal movement of an operating-rod, said rod being fitted in the stem of the auger so as to move lengthwise therein and being provided at its upper end with a hand-piece by which it may be operated. The stem of the auger, which is preferably tubular, serves as a support for the arms, which carry the blades, and in the preferred construction illustrated said arms are pivoted at opposite sides of a casing which is formed with or connected to the lower end of the stem. At its upper end the stem carries handles by which it may be rotated to rotate the blades in boring. The purpose of the operating-rod is to provide for spreading the blades to discharge the dirt taken up by them or for any other purpose. The operating-rod serves also as a means for locking the blades in operative position.

Referring now to the drawings for a detailed description of the various features of my invention, 14 15 indicate the blades of the auger, of which 16 17, respectively, are the projecting front edge portions. It will be noted from an inspection of Figs. 1, 3, 7, and 8 that the blades when in operative position form in general a cylindrical figure which is approximately of uniform diameter, except at the bottom, where the blades are rounded to bring the intermediate portions of the lower edges of the blades closer together, so that they form substantially an elliptical figure, as shown in Fig. 7. The rear side edge of one blade and the forward side edge of the other are curvilinear and lie substantially parallel and a short distance apart, so that a narrow passage is left between them, said passage extending downward and forward to near the lower edges of the blades, where it curves more sharply backward, merging into the elliptical space outlined by the lower edges of the blades, as shown in Figs. 1 and 8. This is secured by shaping each of the blades as shown in Fig. 3, the front edge of the blade being curved gently forward and outward until it almost meets the lower edge of the blade, where it is reversely curved, forming a point. The rear edge of the blade is curved in substantially the same way until it merges with the bottom thereof, which is substantially horizontal throughout the greater part of its length, being curved downward as it approaches the front edge, which it meets at approximately a right angle, forming the point above referred to. This is fully illustrated in Figs. 1 and 2. As shown in Fig. 7, the upper portions of the blades when in operative position form a substantially circular figure in cross-section, while the lower edges thereof form a substantially elliptical figure. It will be observed from an inspection of Figs. 7 and 8 that the forward edges of the blades lie outside of the rear edges thereof, the latter being nearer the axis of the auger than the former, and also that the point of each blade when the blades are in operative position extends forward of or overlaps the upper portion of the rear edge of the other blade. By thus constructing and arranging the blades I provide an auger which is much more efficient than any other of which I am aware, since it bores more rapidly, as well as more easily, than prior constructions.

The blades 14 15 are carried by arms 18 19, respectively, pivoted between their ends on pivots 20 21, carried by the casing 22. As shown in Fig. 2, said casing is provided at opposite sides with openings through which the arms 18 19 pass.

23 24 indicate the inner ends of the arms 18 19, which, as shown in Fig. 2, are rounded and are adapted to engage opposite sides of a wedge-shaped block 25, which in the construction illustrated is formed integral with a slide 26, which is connected to the lower end of the operating-rod 27, as shown in Fig. 4. The slide 26 is provided with a transverse passage 28, extending over the block 25, which receives the inner ends 23 24 of the arms 18 19 when said slide is depressed. As shown by dotted lines in Figs. 1 and 2, the roof of the passage 28 is inclined downwardly toward the sides of the block, so that when the slide is depressed far enough to cause the inner ends 23 24 of the arms 18 19 to engage said inclined surfaces the blades 14 15 are spread or caused to separate. Upward movement of the slide 26, by reason of the engagement of the block 25 with the ends 23 24, forces the blades together.

29 indicates the stem of the auger, which is secured to the upper portion of the casing 22 and carries handles 30 31 at its upper end.

32 indicates a handpiece at the upper end of the operating-rod 27, as shown in Fig. 1.

33 indicates the removable side plate of the casing 22, which, as shown in Fig. 4, has its upper edge fitted under a lip 34, which depends from the upper portion of the casing, the lower portion of said side plate being secured to the casing by bolts 35. This construction is simpler, cheaper, and makes the side plate more easily removed and inserted than where it is entirely secured by bolts, as in the construction of my former patent.

The arrangement shown in Figs. 1 to 4, inclusive, may be employed where it is not desired to lock the operating-rod against longitudinal movement. Where, however, such locking is desired, I provide the lower end of the operating-rod 27 with a cross-head 36, arranged to project through a slot 37 in one or both sides of the slide 26. Said cross-head projects far enough beyond the slide to engage a diagonally-disposed recess 38, provided in the inner face of the side plate 33, as best shown in Figs. 6 and 9. The arrangement is such that by partly rotating the operating-rod 27 the cross-head 36 enters the recess 38, and by reason of the inclination of said recess a wedge action is secured which firmly locks the operating-rod to said side plate, thereby preventing longitudinal movement of said rod. The recess 38 is so placed with reference to the slide 26 that such locking is effected when the block 25 is in engagement with the inner ends 23 24 of the arms 18 19 or when at their highest elevation, at which time the blades are in their operative or normal position, as shown in Fig. 5, so that the locking of the operating-rod effectually locks the blades against movement from their normal position. By turning the operating-rod 27 to move the cross-head 36 out of engagement with the recess 38 the operating-rod may be moved longitudinally and the blades adjusted with reference to each other.

In Figs. 10 to 13 I have illustrated the application of this locking device to supporting devices for blades of the style shown in my former patent. In said construction the blades are carried by arms 39 40, which extend through openings 41 42 in a casing 43 and are pivotally connected together at their inner ends by a rivet 44, which also connects them to a sliding block 45, carried at the lower end of an operating-rod 46. A removable side plate 47 is provided for one side of the casing. The application of my improved locking device to this style of auger is substantially the same as that already described, the side plate 47 having an inclined recess 48, which receives a cross-head 49, carried at the lower end of the operating-rod 46. When the operating-rod is moved longitudinally, the arms 39 40 slide in the openings 41 42 and rock in such openings, the casing around said openings forming a bearing for said arms. The style of blades illustrated in Figs. 1, 2, 7, and 8 may of course be used in connection with the arms 39 40.

It will be noted that each of the forms of slide shown is an integral piece, those forms shown in Figs. 5 and 6 and 10 and 11, respectively, in which provision is made for locking the slides against longitudinal movement, being detachably connected with the operating-rods by providing said slides with laterally-open slots, as illustrated in said figures.

In the construction shown in Figs. 1 to 4 the blades may be locked in operative position without positively locking the operating-rod by moving the slide up to the limit of its movement, so as to force the wedge-block tightly between the inner ends of the arms 18 19. As the inclination of the sides of said block is comparatively slight, when said block is forced up between said arms the friction between the inner ends of said arms and said block is sufficient to lock the blades in position; but they may be readily released by depressing the block by means of the operating-rod.

It will be understood that the forward and lower edges of the blades are sharpened, so that the auger may be used for boring as well as for spading.

I wish it to be understood that while I have described in detail the embodiment of the various features of my invention as illustrated in the accompanying drawings I do not restrict myself to such details of construction, except in so far as they are particularly claimed.

That which I claim as my invention, and desire to secure by Letters Patent, is—

1. An earth-auger, having curved blades which when in operative position together form a substantially cylindrical figure, the forward side edge of each blade lying outside of the rear edge of the other blade and the lower forward portion of each blade overlapping the upper rear portion of the other blade, substantially as described.

2. An earth-auger, having curved blades which when in operative position together form a substantially cylindrical figure, said blades having substantially horizontal bottom edges and inclined front edges the bottom edges of said blades forming a substantially elliptical figure.

3. An earth-auger, having curved blades which when in operative position together form a substantially cylindrical figure, said blades having substantially horizontal bottom edges and inclined front edges, said front and bottom edges coming together to form a point the bottom edges of said blades forming a substantially elliptical figure.

4. An earth-auger, having curved blades forming together when in operative position a substantially cylindrical figure, the lower intermediate portions of said blades being curved inward, the upper portions of said blades together forming a substantially circular figure in cross-section, and the lower edges of said blades forming a substantially elliptical figure.

5. An earth-auger, having curved blades forming together when in operative position a substantially cylindrical figure, the lower intermediate portions of said blades being curved inward, the upper portions of said blades together forming a substantially circular figure in cross-section, and the lower edges of said blades forming a substantially elliptical figure, said blades being arranged to overlap.

6. An earth-auger, comprising a pair of substantially semicylindrical blades, the contour of the rear edge of one of said blades being substantially parallel with the forward edge of the other blade when said blades are in operative position, said forward edges being farther from the axis of the auger than the rear edges the side edges of said blades being inclined downward and forward from the upper to the lower portion thereof.

7. An earth-auger, comprising a casing, blade-supports pivotally connected therewith, the upper ends of said blade-supports being inclosed by said casing, blades carried by said blade-supports and means within said casing for moving said blades toward and from each other, substantially as described.

8. An earth-auger, comprising a casing, blade-supports pivotally connected therewith, the upper ends of said blade-supports being inclosed by said casing, blades carried by said blade-supports means within said casing for moving said blades toward and from each other, and means for locking said blades in operative position, substantially as described.

9. An earth-auger, comprising a casing, blade-supports pivotally connected therewith, the upper ends of said blade-supports being inclosed by said casing, blades carried by said blade-supports and longitudinally-movable means within said casing for moving said blades toward and from each other, substantially as described.

10. An earth-auger, comprising a casing, blade-supports pivotally connected therewith, the upper ends of said blade-supports being inclosed by said casing, blades carried by said blade-supports longitudinally-movable means within said casing for moving said blades toward and from each other, and means for locking said blades in operative position, substantially as described.

11. An earth-auger, comprising a casing, blades fulcrumed therein, a wedge-block for moving said blades laterally, and means for operating said wedge-block, substantially as described.

12. An earth-auger, comprising a casing, blades fulcrumed therein, a wedge-block for moving said blades laterally, means for operating said wedge-block, and means for locking said wedge-block in a fixed position, substantially as described.

13. An earth-auger, comprising a casing, blades connected therewith, and a wedge-block for moving said blades toward and from each other, substantially as described.

14. An earth-auger, comprising a casing, blades connected therewith, a wedge-block for moving said blades toward and from each other, and means for locking said wedge-block in a fixed position, substantially as described.

15. An earth-auger, comprising a casing having an inclined slot, blades fulcrumed in said casing, means for moving said blades laterally, said moving means having devices adapted to engage said inclined slot to lock the blades in a fixed position, substantially as described.

16. An earth-auger, comprising blades, a casing having an inclined slot, and a longitudinally-movable rod connected with said blades for moving them into and out of operative position, said rod having means adapted to engage said inclined slot for locking said rod against longitudinal movement, substantially as described.

17. An earth-auger, comprising a casing having an inclined slot, blades pivotally mounted in said casing, a longitudinally-movable rod, a block connected with said rod and arranged to adjust the position of said blades, and means carried by said rod arranged to engage said inclined slot for locking the blades in operative position, substantially as described.

18. An earth-auger, comprising a casing, a removable side plate therefor, said side plate having an inclined slot on the inner face thereof, blades fulcrumed in said casing, a longitudinally-movable rod connected with said blades, and means carried by said rod adapted to engage said inclined slot for locking said blades in position, substantially as described.

19. An earth-auger, comprising a casing, a removable side plate therefor, said casing having an overlapping lip adapted to engage and retain one edge of the side plate, means for securing the opposite edge of the side plate to the casing, blades fulcrumed in said casing, and a longitudinally-movable rod for adjusting the position of said blades, substantially as described.

20. An earth-auger, comprising a casing, blades having arms pivotally mounted between their ends in said casing, means in said casing adapted to engage the inwardly-projecting ends of said arms for adjusting the position of said blades, and means for actuating said adjusting means, substantially as described.

21. An earth-auger, comprising a casing, blades having arms pivotally mounted between their ends in said casing, a wedge-block in said casing adapted to engage the inwardly-projecting ends of said arms for adjusting the position of said blades, and means for actuating said adjusting means, substantially as described.

22. An earth-auger, comprising a casing, blades having arms pivotally mounted between their ends in said casing, a wedge-block in said casing adapted to engage the inwardly-projecting ends of said arms for adjusting the position of said blades, means for actuating said adjusting means, and means for locking said wedge-block in position, substantially as described.

23. An earth-auger, comprising a casing having an inclined slot, a longitudinally-movable slide within said casing, blades operated by said longitudinally-movable slide, and a rod connected with said slide and having means adapted to engage said slot for locking the said blades in position, substantially as described.

24. An earth-auger, comprising blades, a casing, an integral slide in said casing for operating said blades, and an operating-rod detachably connected with said slide for moving the same longitudinally, substantially as described.

25. An earth-auger, comprising blades, a casing, an integral slide in said casing for operating said blades, and an operating-rod detachably connected with said slide for moving the same longitudinally, said rod having means adapted to engage said casing for locking the slide in position, substantially as described.

26. An earth-auger, having a pair of curved blades, the upper portions thereof forming together when in operative position a substantially cylindrical figure, the lower portions of said blades being curved inward and forming substantially horizontal lower edges, said lower edges together forming a substantially elliptical figure.

27. An earth-auger, having a pair of curved blades, the upper portions of which form together when in operative position a substantially cylindrical figure, the front edge of each of said blades extending spirally forward and downward, the rear edges thereof being similarly curved, said blades having bottom edges which merge with said forward and rear edges.

28. An earth-auger, having a pair of curved blades, the upper portions of which form together when in operative position a substantially cylindrical figure, the front edge of each of said blades extending spirally forward and downward, the rear edges thereof being similarly curved, said blades having bottom edges which merge with said forward and rear edges forming a point at the lower front portion of each blade.

29. An earth-auger, having a pair of curved blades, the upper portions of which form together when in operative position a substantially cylindrical figure, the front edge of each of said blades extending spirally forward and downward, the rear edges thereof being similarly curved, said blades having bottom edges which merge with said forward and rear edges, the lower front portion of each blade being arranged to overlap the upper rear portion of the adjacent blade.

30. An earth-auger blade substantially semi-cylindrical in form and having cutting front and bottom edges the side edges of said blade being downwardly and forwardly inclined from the upper to the lower portion thereof.

31. An earth-auger blade substantially semi-cylindrical in form and having cutting front and bottom edges, the side edges of said blade being downwardly and forwardly inclined from the upper to the lower portion thereof and a point at the juncture of said front and bottom edges.

32. An earth-auger blade substantially semi-cylindrical in form and having cutting front and bottom edges, the side edges of said blade being downwardly and forwardly inclined from the upper to the lower portion thereof and a downwardly-projecting point at the juncture of said front and bottom edges.

33. An earth-auger blade substantially semi-cylindrical in form and having cutting front and bottom edges, and a point at the juncture of said front and bottom edges, said front and rear edges being inclined spirally downward and forward from the upper to the lower portion thereof.

34. An earth-auger blade substantially semi-cylindrical in form and having cutting front and bottom edges, and a point at the juncture of said front and bottom edges, said front and rear edges being inclined spirally downward and forward from the upper to the lower portion thereof, and said bottom edge being substantially horizontal.

PAUL GAMPHER.

Witnesses:
PAUL E. NOE,
HELEN M. COLLIN.